US012583734B2

(12) United States Patent
Hill et al.

(10) Patent No.: US 12,583,734 B2
(45) Date of Patent: Mar. 24, 2026

(54) FLUID DISPENSING SYSTEM

(71) Applicant: FLUID METERING, INC., Syosset, NY (US)

(72) Inventors: Richard Hill, Bay Shore, NY (US); Nicolas Mercier, Huntington, NY (US)

(73) Assignee: FLUID METERING, INC., Syosset, NY (US)

( * ) Notice: Subject to any disclaimer, the term of this patent is extended or adjusted under 35 U.S.C. 154(b) by 182 days.

(21) Appl. No.: 18/284,427

(22) PCT Filed: Apr. 7, 2022

(86) PCT No.: PCT/US2022/023843
§ 371 (c)(1),
(2) Date: Sep. 27, 2023

(87) PCT Pub. No.: WO2022/216936
PCT Pub. Date: Oct. 13, 2022

(65) Prior Publication Data

US 2024/0158219 A1 May 16, 2024

Related U.S. Application Data

(60) Provisional application No. 63/172,271, filed on Apr. 8, 2021.

(51) Int. Cl.
*B67D 7/08* (2010.01)
*B05B 1/02* (2006.01)
(Continued)

(52) U.S. Cl.
CPC .................. *B67D 7/08* (2013.01); *B05B 1/02* (2013.01); *B05B 1/08* (2013.01); *B67D 7/30* (2013.01);
(Continued)

(58) Field of Classification Search
CPC .... B67D 7/08; B67D 7/30; B05B 1/02; B05B 1/08; F04B 13/00; F04B 17/03; F04B 49/20
See application file for complete search history.

(56) References Cited

U.S. PATENT DOCUMENTS 3,168,872 A * 2/1965 Pinkerton ................ F04B 7/06 417/500
4,008,003 A * 2/1977 Pinkerton ................ F04B 5/02 137/99
(Continued)

FOREIGN PATENT DOCUMENTS

EP 1485204 B1 2/2006
EP 1654346 B1 8/2017
(Continued)

OTHER PUBLICATIONS

Extended European Search Report for European Patent Application No. 22785448.6 dated Feb. 6, 2025, 10 pages.
(Continued)

*Primary Examiner* — David P Angwin
*Assistant Examiner* — Michael J. Melaragno
(74) *Attorney, Agent, or Firm* — Duane Morris LLP

(57) ABSTRACT

A system and method for dispensing fluid including a pump having a stepper motor operably connected to a pump head. The pump head has an inlet and an outlet. The inlet is adapted to be in fluid communication to a fluid reservoir. A controller is operably connected to the motor. The controller drives the motor wherein a speed and an acceleration of the stepper motor is selected to overcome adhesion between the dispense tip and the dispensed fluid. A dispense tip formed of a hydrophobic material is in fluid communication with the outlet of the pump head.

18 Claims, 3 Drawing Sheets

(51) Int. Cl.

| | |
|---|---|
| ***B05B 1/08*** | (2006.01) |
| ***B67D 7/30*** | (2010.01) |
| ***F04B 13/00*** | (2006.01) |
| ***F04B 17/03*** | (2006.01) |
| ***F04B 49/20*** | (2006.01) |

(52) U.S. Cl.

CPC .............. *F04B 13/00* (2013.01); *F04B 17/03* (2013.01); *F04B 49/20* (2013.01)

(56) References Cited

U.S. PATENT DOCUMENTS

| | | | | | |
|---|---|---|---|---|---|
| 4,941,809 | A * | 7/1990 | Pinkerton | F04B 13/00 | 92/13 |
| 5,312,233 | A * | 5/1994 | Tanny | F04B 13/00 | 417/415 |
| 5,738,728 | A * | 4/1998 | Tisone | B05B 9/0413 | 239/371 |
| 5,811,306 | A * | 9/1998 | Komatsu | G01N 35/00029 | 73/864.22 |
| 5,916,524 | A * | 6/1999 | Tisone | G01N 35/1009 | 239/371 |
| 5,927,547 | A * | 7/1999 | Papen | G01N 35/1065 | 436/180 |
| 6,126,039 | A * | 10/2000 | Cline | B01F 25/43141 | 222/459 |
| 6,213,354 | B1 * | 4/2001 | Kay | B01L 3/0262 | 222/14 |
| 6,713,021 | B1 * | 3/2004 | Shvets | B05B 1/302 | 251/129.08 |
| 6,997,216 | B2 * | 2/2006 | Ryu | G02F 1/1341 | 349/189 |
| 7,316,248 | B2 * | 1/2008 | Jeong | B05B 1/02 | 141/286 |
| 7,470,547 | B2 * | 12/2008 | Tisone | B05B 5/16 | 422/504 |
| 7,775,244 | B2 * | 8/2010 | Kwak | G01F 25/0092 | 141/192 |
| 8,176,949 | B2 * | 5/2012 | Kwak | G02F 1/1303 | 141/192 |
| 10,935,021 | B2 * | 3/2021 | Beauman | F04B 53/16 | |
| 2001/0036424 | A1 * | 11/2001 | Takahashi | B82Y 30/00 | 422/131 |
| 2002/0177237 | A1 * | 11/2002 | Shvets | F16K 37/0041 | 436/180 |
| 2002/0197164 | A1 * | 12/2002 | Hogan | G01F 11/22 | 417/20 |
| 2004/0265480 | A1 * | 12/2004 | Jeong | B05C 11/1034 | 427/64 |
| 2005/0013708 | A1 * | 1/2005 | Peeler | F04B 49/12 | 417/415 |
| 2005/0056713 | A1 * | 3/2005 | Tisone | B01D 19/0047 | 239/690 |
| 2005/0126475 | A1 * | 6/2005 | Jeong | B05B 1/02 | 118/300 |
| 2006/0002824 | A1 | 1/2006 | Chang et al. | | |
| 2006/0138165 | A1 * | 6/2006 | Kim | G01G 17/04 | 222/77 |
| 2007/0125796 | A1 * | 6/2007 | Cedrone | F04B 13/00 | 222/14 |
| 2007/0128048 | A1 * | 6/2007 | Gonnella | F04B 49/065 | 417/44.1 |
| 2009/0132094 | A1 * | 5/2009 | Laverdiere | F04B 43/02 | 222/336 |
| 2010/0294048 | A1 * | 11/2010 | McGuire | B01L 3/0293 | 73/864.34 |
| 2014/0044570 | A1 * | 2/2014 | Cedrone | F04B 9/02 | 417/244 |
| 2016/0032909 | A1 * | 2/2016 | Fiesser | F04B 13/00 | 239/11 |
| 2024/0158219 | A1 * | 5/2024 | Hill | F04B 13/00 | |

FOREIGN PATENT DOCUMENTS

| | | | | | |
|---|---|---|---|---|---|
| JP | 2000516526 | A | 12/2000 | | |
| JP | 200518078 | A | 1/2005 | | |
| JP | 2019205974 | | 12/2019 | | |
| WO | 9804358 | | 2/1998 | | |
| WO | 2000066269 | A1 | 11/2000 | | |
| WO | WO-2023177631 | A2 * | 9/2023 | B05B 9/0403 | |
| WO | WO-2023177631 | A9 * | 2/2025 | A47J 31/46 | |

OTHER PUBLICATIONS

Examination Report issued for Australian Patent No. 2022254709 dated May 16, 2025, 3 pages.

Examination Report issued for Australian Patent No. 2022254709 dated Oct. 29, 2024, 2 pages.

Oct. 21, 2024 Japanese Office Action issued in connection with Japanese Patent Application No. 2023-561366.

International Search Report issued in connection with International Application No. PCT/US2022/023843 dated Jun. 3, 2022.

Examination Report issued for Canadian Patent Application No. 3,213,028 dated Aug. 13, 2025, 7 pages.

* cited by examiner

FLUID DISPENSING SYSTEM

CROSS-REFERENCE TO RELATED APPLICATIONS

This application is a National Phase application of International Application No. PCT/US22/023843 filed Apr. 7, 2022, which claims the benefit of priority to U.S. Provisional Patent Application No. 63/172,271 filed Apr. 8, 2021, the contents of both are incorporated by reference herein in their entirety.

TECHNICAL FIELD

The disclosure relates to a fluid dispensing system, and more particularly, to a system for the precise control of fluid dispense volume.

BACKGROUND

Rotating, reciprocating pumps have historically been able to dispense fluid volumes down to one (1) microliter. The fluid is typically dispensed in droplets from a dispense tip. However, the dispensed droplet typically requires additional intervention to be able to release and fall from the dispense tip. Such interventions may either be for the dispense tip to be submerged into a liquid or for the dispense tip to be contacted with an external surface to release the droplet. It has been determined that the smallest dispense volumes that will cleanly break away from the dispense tip, while in air, is around ten (10) microliters.

Other existing technologies, such as piezo electric inkjet, which uses heat to dispense, and the BioDot® system dispensing technologies, allow for a fluid dispense at or below one (1) microliter in air. However, these technologies do not utilize a rotating, reciprocating pump. Use of a rotating, reciprocating pump permits a dispenser to be incorporated into unique products and avoid subjecting the dispensed media to heat.

Accordingly, it would be desirable to provide a fluid dispensing system that achieves a one microliter dispense in air using a rotating, reciprocating pump.

SUMMARY

The present disclosure provides a system and method for dispensing fluid including a pump having a stepper motor operably connected to a pump head. The pump head has an inlet and an outlet. The inlet is adapted to be in fluid communication to a fluid reservoir containing a fluid to be dispensed. A dispense tip including a hydrophobic material is in fluid communication with the outlet of the pump head. A controller is operably connected to the stepper motor for activating and deactivating the stepper motor. The controller activating and driving the stepper motor at a predetermined speed causing the pump head to move the fluid through the dispense tip such that adhesion between the dispense tip and the dispensed fluid is overcome and no drop of dispensed fluid remains adhered to the dispense tip after the stepper motor is deactivated.

The present disclosure also provides a system for dispensing fluid including a reciprocating, rotating pump having a stepper motor operably connected to a pump head. The pump head has an inlet and an outlet. The inlet is adapted to be in fluid communication to a fluid reservoir. A dispense tip is in fluid communication with the outlet of the pump head. The dispense tip has an inside diameter ("ID") in the range of 0.010" to 0.020" formed of a hydrophobic material. A controller is operably connected to the stepper motor. The controller driving the stepper motor at a speed in the range of approximately 600 to 1500 RPMs with an acceleration in the range of approximately 38,000 steps/second to 140,000 steps/sec$^2$, such that the stepper motor causes the pump head to move the fluid through the dispense tip wherein the adhesion between the dispense tip and the dispensed fluid is overcome and no drop of dispensed fluid remains adhered to the dispense tip after the stepper motor is deactivated.

The present disclosure further provides, a method of dispensing fluid comprising:

- providing a pump having a stepper motor operably connected to a pump head, the pump head having an inlet and an outlet, the inlet being adapted to be in fluid communication to a fluid reservoir and the outlet being in fluid communication with a dispense tip formed of a hydrophobic material;
- driving the stepper motor and the pump head wherein a speed and an acceleration of the stepper motor is selected to cause the pump head to drive the fluid to overcome adhesion between the dispense tip and dispensed fluid wherein no drop of dispensed fluid remains adhered to the dispense tip after the stepper motor is deactivated; and
- dispensing from the dispense tip a volume of disposed fluid 1 microliter or less.

DETAILED DESCRIPTION

Figure 1:
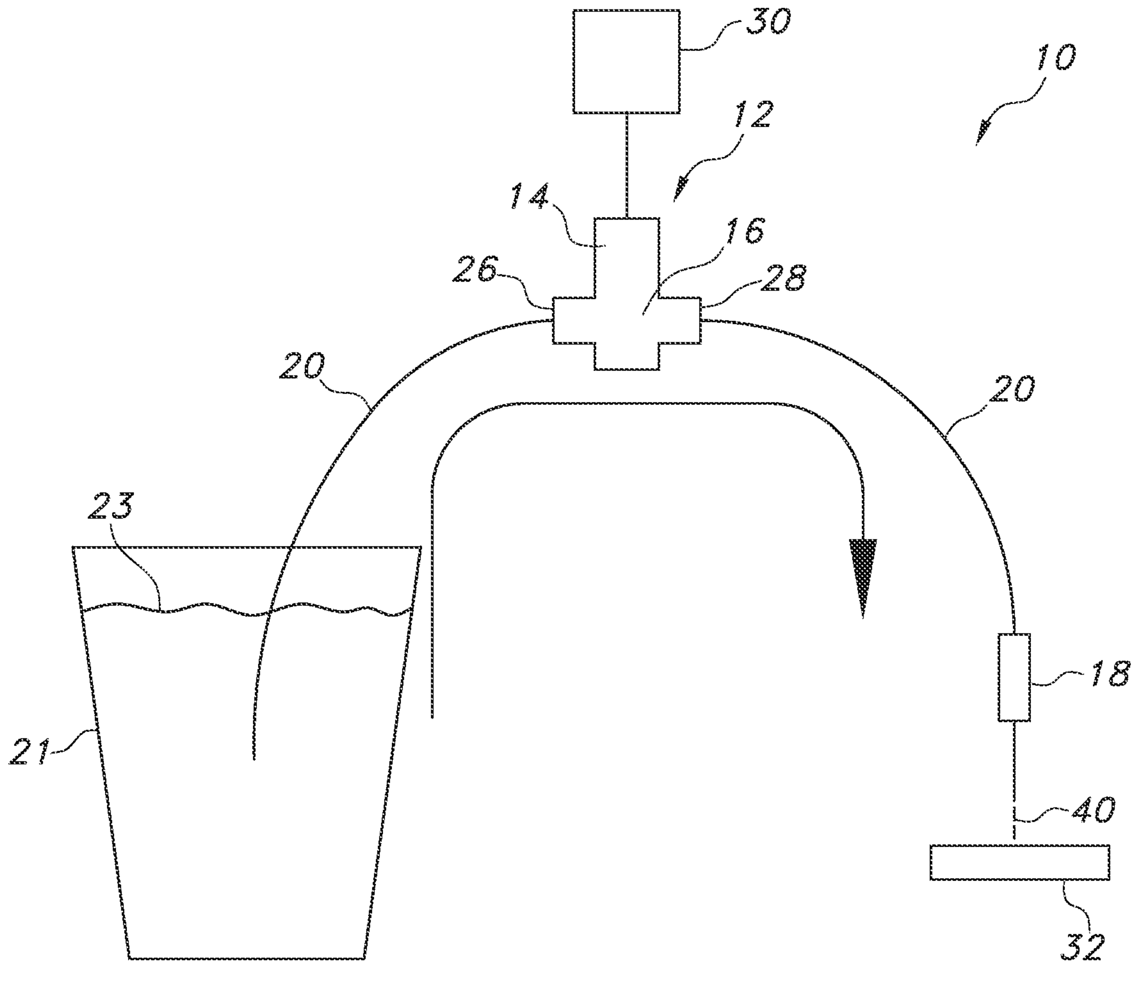
FIG. 1 is a schematic representation of the dispensing system.
Figure 2:
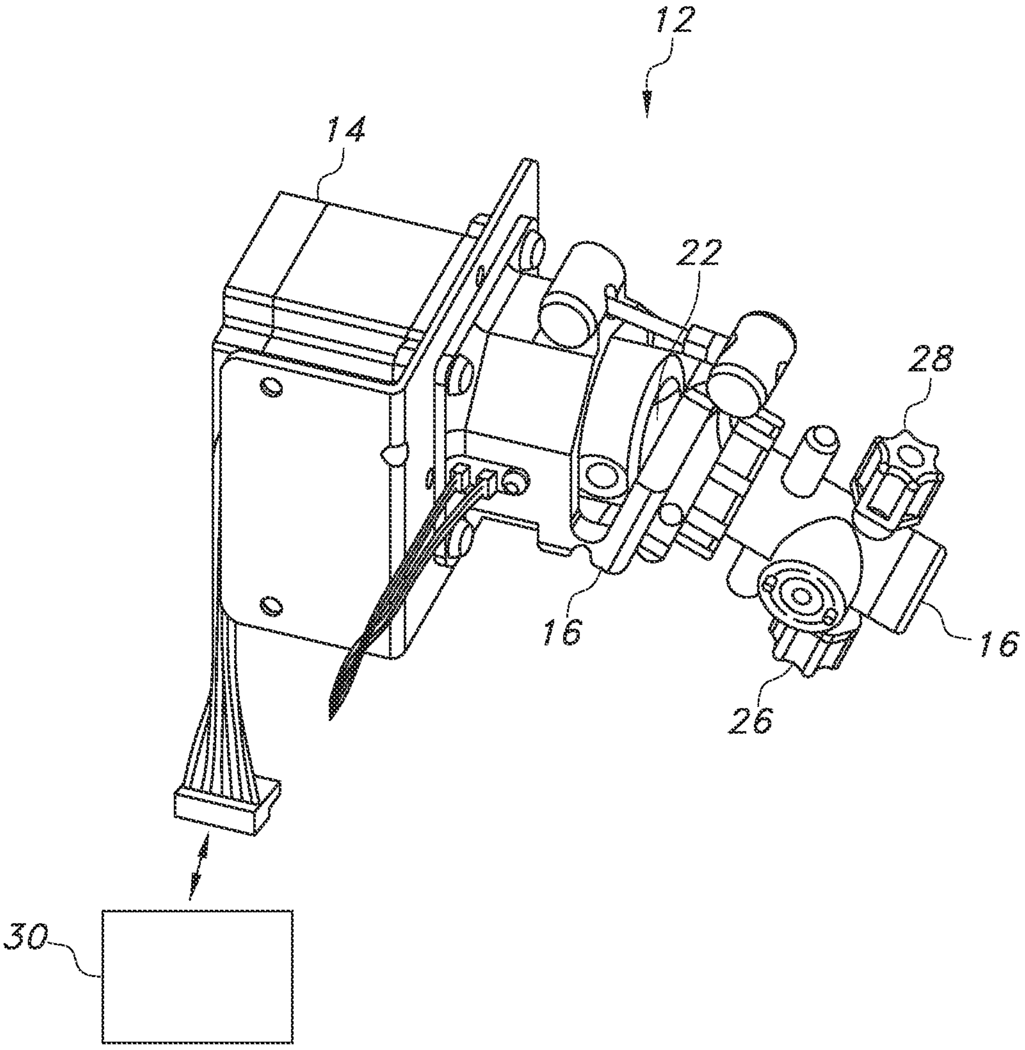
FIG. 2 is a perspective view of a pump used in the dispensing system.

With reference to FIGS. 1 and 2, the disclosure is directed to a fluid dispensing system 10 that causes fluid droplets to separate from a dispense tip, while in air, down to below one (1) microliter in volume or less. The system 10 includes a pump 12 including a motor 14 and a pump head 16. The pump 12 is fluidly connected to a dispense tip 18. Tubing 20 connects the pump 12 to a fluid reservoir 21 containing a fluid 23.

Figure 3:
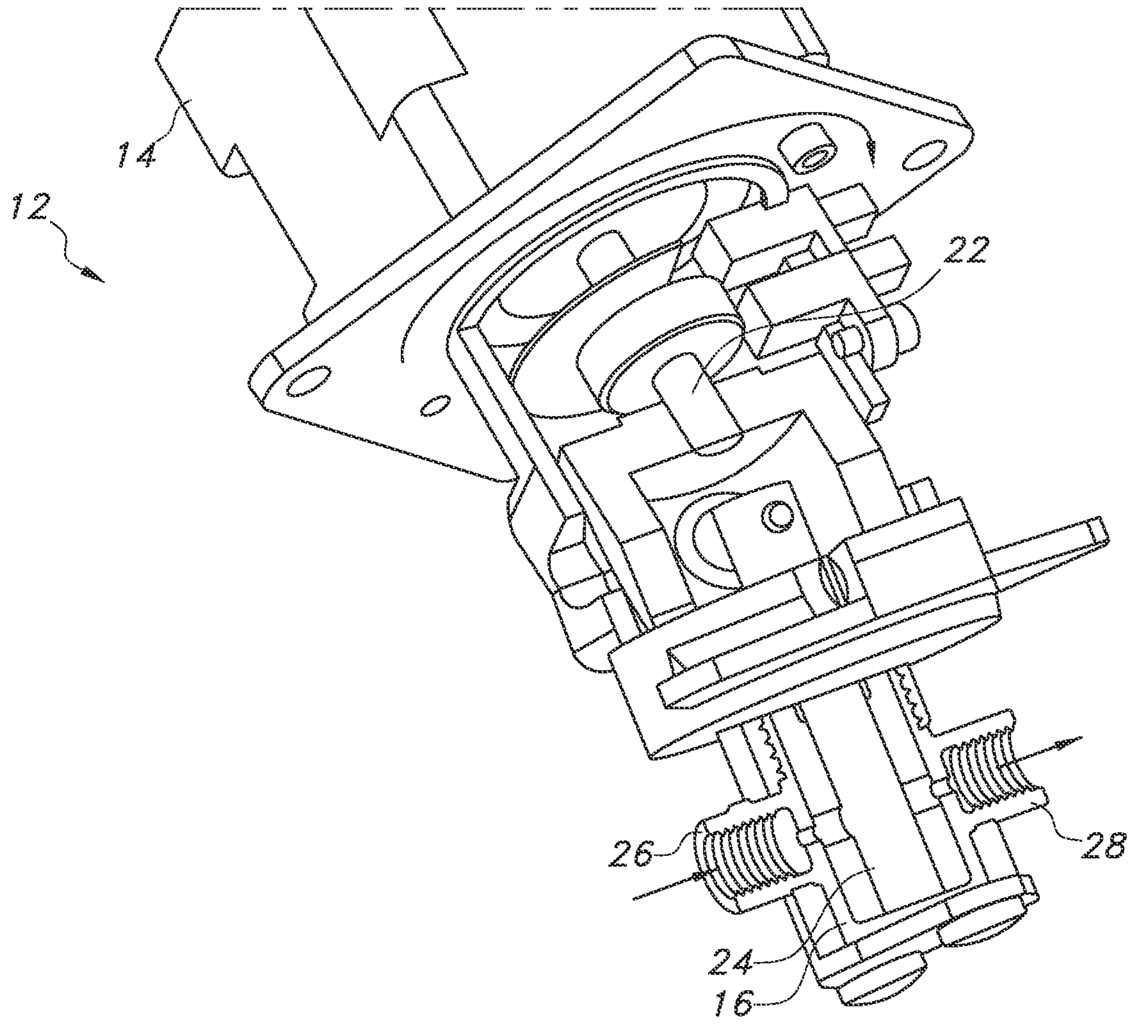
FIG. 3 is a partial cross-sectional view of the pump of FIG. 2.

With reference to FIGS. 2 and 3, the motor 14 has a shaft 22 that rotates about a rotational axis and the pump head 16 has a piston 24 that rotates about a rotational axis and translates in the direction of the rotational axis. The motor shaft 22 is coupled to the pump piston 24 so that rotation of the motor shaft 22 will cause rotation of the pump piston. In addition, by tilting the rotational axis of the pump piston with respect to the rotational axis of the motor shaft, rotation of the motor shaft will also cause linear translation of the pump piston. Such a pump 12 is shown and described in U.S. Pat. Nos. 3,168,872, 4,008,003, 4,941,809, and 10,935,021 the contents of which are incorporated by reference herein.

In one embodiment, the pump 12 may be a fixed-link pump that is calibrated down to a one (1) microliter single dispense volume or less. In an alternative embodiment, the system utilizes a pump with a variable head that has been set down to one (1) microliter in single dispense volume or less.

In one embodiment, the motor shaft 22 is coupled to a pump piston 24, and each rotation of the motor shaft 22 rotates the piston 24 of the pump. Due to the angular orientation between the pump and the motor, each rotation of the motor shaft 22 further causes the pump piston 24 to reciprocate in the axial direction to alternately draw in and push out the fluid 23 to transfer fluid between a pump inlet 26 and a pump outlet 28. The amplitude of the piston stroke determines the volume of the fluid delivered between the pump inlet and the outlet. By varying the angle of the pump head 16 with respect to the stepper motor 14, the stroke of the piston is adjusted, thereby adjusting the volume of the fluid transferred between the inlet and the outlet.

In one embodiment, the motor 14 may be a stepper motor of a type capable of operating at speeds in the range of approximately 600 to 1500 RPMs or alternatively a range of approximately 900 to 1275 RPMs. The stepper motor 14 is also capable of operating with an acceleration in the range of approximately 38,000 steps/second to 140,000 steps/sec$^2$ or alternatively, a range of approximately, 57,000 steps/second$^2$ to 79,600 steps/sec$^2$. Speeds and accelerations slightly outside this range may also provide acceptable dispense performance. In one embodiment, the stepper motor 14, for example, may be a NEMA Frame 17—type motor operated at a speed of 1000 RPM's and an acceleration of 57,220 steps/second 2. The particular speed and acceleration of the stepper motor 14 may be selected based on factors such as the type of fluid and the size of the dispense tip. The stepper motor 14 is connected to a motor controller 30 of a type known in the art. The motor controller 30 activates and deactivates the motor 14 to drive the pump head 16 to dispense the desired amount of fluid 23. Such a control, for example, may include Intelligent Stepper Motor Controller marketed by Fluid Metering, Inc., which includes an embedded microprocessor for custom programming of stepper motor pumps.

The pump head inlet port 26 is in fluid communication with a fluid reservoir 21 via tubing 20. In one embodiment, the tubing may be fluorinated ethylene-propylene ("FEP") tubing having an inside diameter ("ID") of 0.062". Alternatively, tubing having an ID 0.031" may be used. It is contemplated that tubing of other dimensions could be used.

The dispense tip 18 may be a high gauge dispense tip may include a hydrophobic material such as polypropylene in which the fluid contacts. It is contemplated that other hydrophobic material could be used to form the dispense tip 18 such as polyether ether ketone (PEEK). Alternatively the dispense tip may include a coating of the hydrophobic material over a non-hydrophobic material. In one embodiment, the dispense tip 18 may have an ID of 0.013" (0.320 mm). However, it is contemplated that other dispense tip sizes would also work such as an ID in the range of 0.010" to 0.020". The dispense tip 18 is connected to pump outlet port 28 via tubing 20. In one embodiment, the tubing may be FEP tubing having an ID of 0.062". Alternatively, tubing having an ID 0.031" may be used. As shown in FIG. 1, the dispense tip 18 is preferably held in a vertical, dispense-end down, position over a dispense container 32.

In order ensure that the precise volume has been dispensed the system 10 prevents any fluid from adhering to, and remaining on, the dispense tip 18. With reference to FIG. 1, in operation, the dispense tip 18 is positioned over a dispense container 32. Only air separates the dispense tip 18 from the dispense container 32. The stepper motor 14 receives a signal from controller 30 that causes the motor 14 to operate at a speed and acceleration selected to move the fluid 23 such that adhesion between the dispense tip 18 and the dispensed fluid is overcome. In one embodiment, the stepper motor is operated at a speed of approximately 1000 RPMs with an acceleration of approximately 57,000 steps/second. This operation drives the piston and causes the pump head to emit a stream of fluid 40 from the dispense tip 18 having a the dispense tip 18 may have an ID of 0.013". The motion of the stepper motor 14 is controlled to provide the desired output fluid volume. After the predetermined time, the stepper motor 14 is deactivated by the controller 30 and stops as does the piston 24 connected thereto.

The dispensed fluid, which has been accelerating through the pump head 16 and dispense tip 18, completely separates from the end of the dispense tip, and no droplet remains adhered to the dispense tip 18. The use of a high rate of acceleration of the fluid driven by the stepper motor 14 provides the fluid with the momentum to overcome the adhesion force between the fluid and the dispense tip 18. In addition, the hydrophobic material of the dispense tip 18 by reducing the adhesive force between the fluid and the dispense tip contributes in the fluid being ejected through the dispense tip such that none of the fluid remains adhered to the dispense tip 18. Therefore, the precise volume of dispensed fluid can be transferred through air to the dispense container 32. The system 10 thus permits small amounts of liquid, on the order of 1 microliter or less, to be precisely and repeatedly dispensed through air using a rotating, reciprocating pump 12.

Given the teachings provided herein, one of ordinary skill in the art will be able to contemplate other implementations and applications of the techniques and disclosed embodiments. Although illustrative embodiments have been described herein with reference to the accompanying drawings, it is to be understood that illustrative embodiments are not limited to those precise embodiments, and that various other changes and modifications are made therein by one skilled in the art without departing from the scope of the appended claims.

What is claimed is:

1. A system for dispensing fluid comprising:

a pump having a stepper motor operably connected to a pump head, the pump head having an inlet and an outlet, the inlet being adapted to be in fluid communication to a fluid reservoir containing a fluid to be dispensed;

a dispense tip including a hydrophobic material, the dispense tip in fluid communication with the outlet of the pump head; and a controller operably connected to the stepper motor for activating and deactivating the stepper motor, the controller driving the stepper motor at a predetermined speed and acceleration causing the pump head to move the fluid through the dispense tip to dispense a single dispense volume of less than 10 microliters in air such that adhesion between the dispense tip and the dispensed fluid is overcome and no drop of dispensed fluid remains adhered to the dispense tip after the stepper motor is deactivated;

wherein the controller drives the stepper motor at a speed in the range of approximately 600 to 1500 RPM's with an acceleration in the range of approximately 38,000 steps/second$^2$ to 140,000 steps/second$^2$.

2. The system as defined in claim 1, wherein the controller drives the motor at a speed 1000 RPM's with an acceleration of 57,220 steps/second$^2$.

3. The system as defined in claim 1, wherein the pump is controlled to dispense in air one (1) microliter in a single dispense volume or less.

4. The system as defined in claim 1, wherein the dispense tip has an ID in the range of 0.010" to 0.020".

5. The system as defined in claim 4, wherein the dispense tip has an ID of 0.013".

6. The system as defined in claim 4, wherein the pump head is fluidly connected to the dispense tip by tubing having an inside diameter in the range of 0.031" to 0.062".

7. The system as defined in claim 6, wherein the tubing is formed of fluorinated ethylene-propylene.

8. The system as defined in claim 1, wherein the stepper motor has a shaft that rotates about a rotational axis and the pump head has a piston connected to the shaft and rotates about a rotational axis and translates in the direction of the rotational axis.

9. The system as defined in claim 1, wherein the pump is a fixed-link pump that is calibrated down to a one (1) microliter single dispense volume or less.

10. The system as defined in claim 1, wherein the pump with a variable head that has been calibrated down to one (1) microliter in single dispense volume or less.

11. The system as defined in claim 1, wherein the dispense tip is formed of a hydrophobic material.

12. A system for dispensing fluid comprising:

a reciprocating, rotating pump having a stepper motor operably connected to a pump head, the pump head having an inlet and an outlet, the inlet being adapted to be in fluid communication to a fluid reservoir containing fluid to be dispensed;

a dispense tip having an ID in the range of 0.010" to 0.020" formed of a hydrophobic material in fluid communication with the outlet of the pump head; and a controller operably connected to the stepper motor for activating and deactivating the stepper motor, wherein the controller drives the stepper motor at a speed in the range of approximately 600 to 1500 RPMs with an acceleration in the range of approximately 38,000 steps/second$^2$ to 140,000 steps/second$^2$ such that the stepper motor causes the pump head to move the fluid through the dispense tip wherein the adhesion between the dispense tip and the dispensed fluid is overcome and no drop of dispensed fluid remains adhered to the dispense tip after the stepper motor is deactivated.

13. The system as defined in claim 12, wherein the pump is a fixed-link pump that is calibrated down to a one (1) microliter single dispense volume or less.

14. The system as defined in claim 12, wherein the stepper motor has a shaft that rotates about a rotational axis and the pump head has a piston connected to the shaft and rotates about a rotational axis and translates in the direction of the rotational axis.

15. A method of dispensing fluid comprising:

providing a pump having a stepper motor operably connected to a pump head, the pump head having an inlet and an outlet, the inlet being adapted to be in fluid communication to a fluid disposed in a fluid reservoir and the outlet being in fluid communication with a dispense tip formed of a hydrophobic material;

driving the stepper motor at a speed in the range of approximately 600 to 1500 RPM's with an acceleration in the range of approximately 38,000 steps/second$^2$ to 140,000 steps/second$^2$ wherein the speed and the acceleration of the stepper motor causes the pump head to drive the fluid to overcome adhesion between the dispense tip and dispensed fluid wherein no drop of dispensed fluid remains adhered to the dispense tip after the stepper motor is deactivated; and dispensing from the dispense tip in air a volume of the dispensed fluid.

16. The method as defined in claim 15, wherein the pump is controlled to dispense in air one (1) microliter in single dispense volume or less.

17. The method as defined in claim 15, wherein the dispense tip is formed of a hydrophobic material.

18. The method as defined in claim 15, wherein the pump is a rotating, reciprocating pump.

* * * * *